United States Patent
Laitinen et al.

(10) Patent No.: US 7,059,275 B2
(45) Date of Patent: Jun. 13, 2006

(54) SURVEILLANCE SYSTEM FOR ANIMALS

(75) Inventors: Arvo Laitinen, Nurmijarvi (FI); Tarmo Lankinen, Latva (FI); Tiina Varho-Lankinen, Latva (FI); Hannu Saloniemi, Helsinki (FI); Jarkko Tuomi, Espoo (FI); Jarkko Vuori, Helsinki (FI)

(73) Assignee: AniWell Oy, Latva (FI)

( * ) Notice: Subject to any disclaimer, the term of this patent is extended or adjusted under 35 U.S.C. 154(b) by 0 days.

(21) Appl. No.: 10/926,969

(22) Filed: Aug. 27, 2004

(65) Prior Publication Data

US 2005/0081797 A1 Apr. 21, 2005

Related U.S. Application Data

(63) Continuation of application No. PCT/FI03/00128, filed on Feb. 21, 2003.

(30) Foreign Application Priority Data

Feb. 27, 2002 (FI) .................................. 20020382

(51) Int. Cl.
*A01K 29/00* (2006.01)
(52) U.S. Cl. ...................... 119/720; 119/721; 340/573.3
(58) Field of Classification Search ............. 119/51.02, 119/720, 719, 721, 905, 908, 651; 340/573.1, 340/573.2, 573.3, 573.4
See application file for complete search history.

(56) References Cited

U.S. PATENT DOCUMENTS

| | | | | |
|---|---|---|---|---|
| 4,463,353 A | * | 7/1984 | Kuzara | 340/10.34 |
| 4,837,568 A | * | 6/1989 | Snaper | 340/10.52 |
| 4,865,044 A | * | 9/1989 | Wallace et al. | 600/549 |
| 5,189,395 A | * | 2/1993 | Mitchell | 340/539.11 |
| 5,315,505 A | * | 5/1994 | Pratt et al. | 600/300 |
| 5,322,034 A | * | 6/1994 | Willham et al. | 340/10.41 |
| 5,568,119 A | * | 10/1996 | Schipper et al. | 340/825.37 |
| 5,673,647 A | * | 10/1997 | Pratt | 119/51.02 |
| 5,791,294 A | * | 8/1998 | Manning | 119/721 |
| 5,803,906 A | * | 9/1998 | Pratt et al. | 600/300 |

(Continued)

FOREIGN PATENT DOCUMENTS

WO 99/45761 9/1999

OTHER PUBLICATIONS

Hecht-Nielsen, R. "Counterpropagation Networks," Proc. of the Int. Conf. on Neural Networks, IEEE Press, Jun. 1987, 19-32.

*Primary Examiner*—Yvonne R. Abbott
(74) *Attorney, Agent, or Firm*—Young & Thompson

(57) ABSTRACT

A system for the surveillance of animals includes identification and measuring elements attached to the animals, as well as at least one local level information system (115), wirelessly connected to the identification and measuring elements of a certain group of animals for saving animal-specific measuring results into the information network. Aiming to provide a new kind of a surveillance system for domestic husbandry that enables different interest groups to monitor the kind of a group of animals they wish, the system includes at least one higher level information system, connected to the chosen local level system through a communications network for the reception of animal-specific measuring results from at the minimum one local system, and at least one software application using the data gathered in the higher level system to produce information about the animals to at the minimum one higher level information system by processing the collected data.

11 Claims, 5 Drawing Sheets

U.S. PATENT DOCUMENTS

Figure 1:
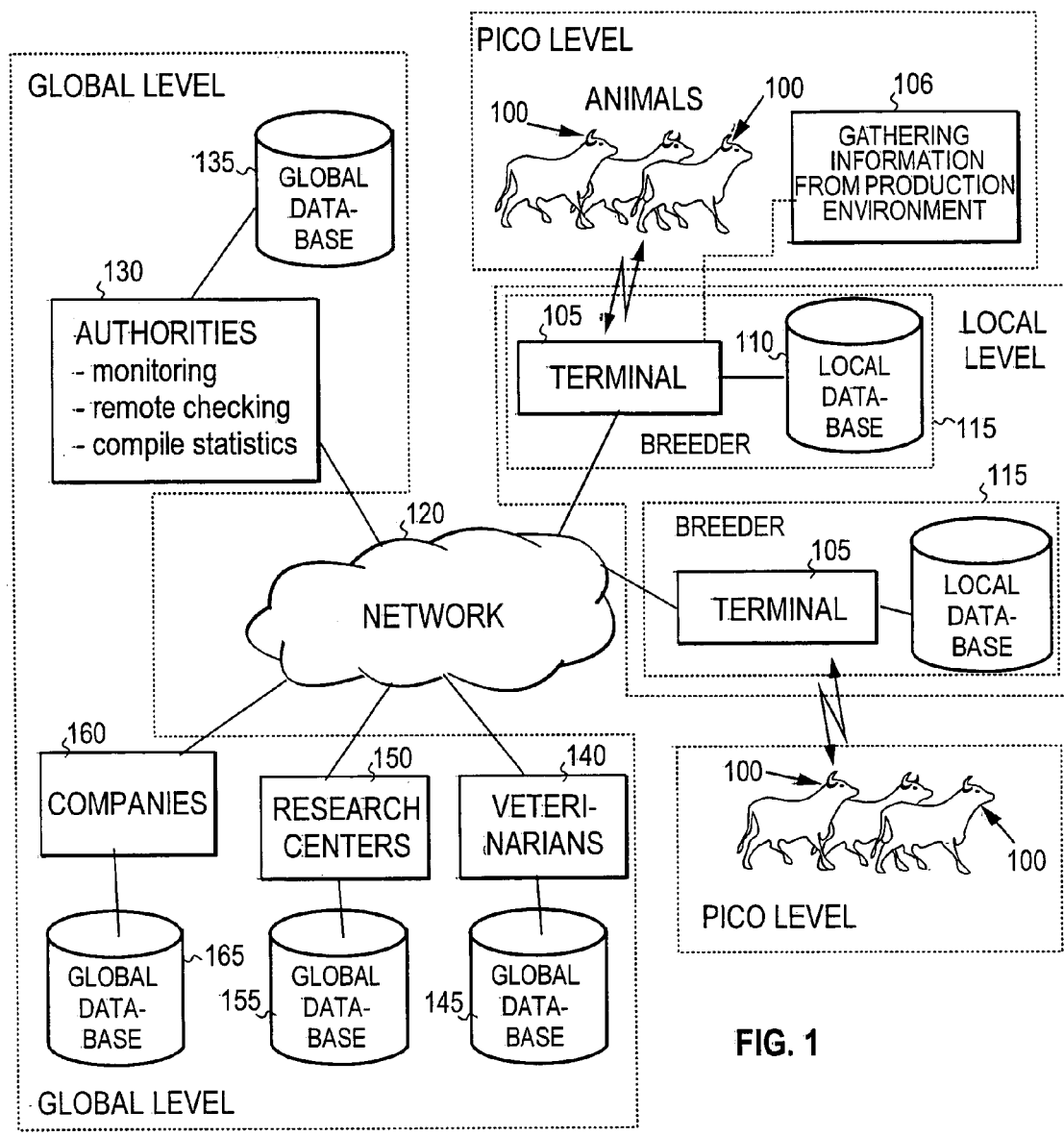

| | | |
|---|---|---|
| 5,818,354 A | 10/1998 | Gentry |
| 5,874,098 A * | 2/1999 | Stevens et al. ............. 424/408 |
| 6,115,679 A * | 9/2000 | Rutter et al. ................ 702/187 |
| 6,155,208 A * | 12/2000 | Schell et al. ................ 119/720 |
| 6,211,789 B1 * | 4/2001 | Oldham et al. .......... 340/573.3 |
| 6,311,644 B1 * | 11/2001 | Pugh .......................... 119/712 |
| 6,334,073 B1 * | 12/2001 | Levine ........................ 607/58 |
| 6,342,839 B1 * | 1/2002 | Curkendall et al. ...... 340/573.3 |
| 6,375,612 B1 * | 4/2002 | Guichon et al. ............ 600/300 |
| 6,427,627 B1 * | 8/2002 | Huisma ................... 119/51.02 |
| 6,512,456 B1 * | 1/2003 | Taylor, Jr. ................ 340/573.1 |
| 6,558,352 B1 * | 5/2003 | Hogan ........................ 604/154 |
| 6,569,092 B1 * | 5/2003 | Guichon et al. ............ 600/300 |
| 6,577,241 B1 * | 6/2003 | Neidig et al. ............. 340/573.3 |
| 6,659,039 B1 * | 12/2003 | Larsen .................... 119/51.02 |
| 6,664,897 B1 * | 12/2003 | Pape et al. ................ 340/573.3 |
| 6,684,810 B1 * | 2/2004 | Martin .................... 119/51.02 |
| 6,814,025 B1 * | 11/2004 | Chen et al. ............... 119/14.01 |
| 2001/0001176 A1 * | 5/2001 | Lopez et al. .............. 119/174 |
| 2001/0016681 A1 | 8/2001 | Pratt et al. |
| 2001/0037083 A1 * | 11/2001 | Hartlaub et al. ............... 604/65 |
| 2003/0038721 A1 * | 2/2003 | Hogan ..................... 340/573.3 |
| 2003/0062001 A1 * | 4/2003 | Andersson ................. 119/174 |
| 2003/0137431 A1 * | 7/2003 | Hogan ................... 340/870.11 |
| 2003/0177025 A1 * | 9/2003 | Curkendall et al. ............. 705/1 |

* cited by examiner

SURVEILLANCE SYSTEM FOR ANIMALS

CROSS REFERENCE TO RELATED APPLICATIONS

This is a continuation of International Application PCT/FI03/00128 filed on Feb. 21, 2003, which designated the United States of America.

FIELD OF THE INVENTION

The invention generally relates to the surveillance of animals. More specifically, it describes a system for the surveillance of a group of animals and their surroundings, based on the single animal identification method. The information provided by the system can also be used, e.g., for the feedback control and adjustments of the conditions of a single animal.

BACKGROUND OF THE INVENTION

Productivity factors and stricter quality requirements call for new innovations in animal husbandry. Traditionally these demands have been met by increasing the product unit's size and efficiency, as well as by acknowledging the possibilities embedded in enhanced feed and breeding. As human labor has become more expensive and the typical enterprise larger in the course of the last century, technologies and methods of care taking have also been actively developed.

As a result of increased unit sizes, the traditional personal interaction between the human and the animal is no longer possible. Growth poses a threat to the animals' health as well. Infectious diseases and/or poor quality of feed, for instance, have become serious problems, even on the international level.

If problems due to overproduction are to be controlled, it is vital that real-time information about the production of agricultural goods, e.g. milk, is available. To be able to control global changes in the levels of production, certain predictability is a precondition. This can only be achieved when data about all factors contributing to the level of production can be gathered from as many a production unit as possible.

Stricter consumer demands are reflected in animal husbandry too. Only goods that do not have any flaws and whose origins are known are accepted by the food industry. The so-called health foods, for instance, impose strict criteria to the conditions of the primary production; only well-controlled products, whose origins of as a link in the value chain can be reliably investigated, are approved of.

Today, various mechanisms of subsidizing and pricing that support the structures of production are also a part of the domain of animal husbandry. While agricultural and basic domestic animal products are seen as vital for national self-sufficiency, these goods are at the same time sold for less than their real production costs on the world market. National subsidies and differing production costs enable the creation of frameworks of speculation and speculative profits.

To cope with the above-mentioned and other threats, animal identification systems have been developed that can be used, for instance, to investigate the origins or health conditions of animals. The US patent application US2001/0016681 describes a system with which it is possible to keep health records of individual animals and to, for example, obtain information about the medication used for treating each animal. Animal identification is based on a code (e.g. bar code) in the earmark, which can be read with a manual scanner. Patent U.S. Pat. No. 5,818,354, on the other hand, features a telemetric system for the individual surveillance of the physical condition of each animal in a larger group, as indicated by heart rate and body temperature. Each animal wears a collar with censors and a transmitter that sends the measured data to a portable receiver.

One of the downsides of these known solutions is their locality, that is to say, the fact that they offer surveillance and other information only locally, within a certain environment (e.g. one producer) and with regard to a certain purpose. Practicing animal husbandry always necessitates the interaction of different reference groups with differing interests as far as the size of the group to be controlled and the desired measures are concerned. In addition to tenders and farmers, authorities and specialists of different fields, for example, often partake in the processes and if they wish to single out the animals of a certain producer, or a specific animal, for control or other measures, it is nowadays necessary that they go physically to the farm in question.

The invention described here aims to create a new kind of a surveillance system which is not hampered by the beforementioned flaws and which could significantly enhance the practicing of animal husbandry in relation to the requirements above.

BRIEF SUMMARY OF THE INVENTION

The aim of the invention is to create a new kind of a surveillance system to be used in the field of animal husbandry, one that would enable different interest groups to monitor, even simultaneously, the kind of an animal group they wish in order to meet their respective goals. The surveillance can be arranged so that its subjects and objects know nothing of one another. The basic system, as described in the invention, can thus be used for different applications, at the same time when necessary. The biggest beneficiaries of the system would be those professionally involved in animal husbandry, though it is also suitable for the surveillance of single animals.

The goals of the invention can be achieved by solutions delineated in individual patent requirements.

The invention describes a system of individual animal identification in which the surveillance data is, in addition to the local system, saved into at least one other information system that is connected to the local one through a communications network in order to enable the gathering of data concerning single animals and the creation of comprehensive surveillance information. In practice such a surveillance system comprises at least three hierarchical levels of technology, the network technology joining the levels and knowledge controlled by the system. Thus the system consists of three hierarchical levels of technology, the lowest of which being the devices used directly with the animals. The other two refer to the data collected by the network connecting the levels and the knowledge offered by the overall system respectively.

Preferable embodiments of the invention feature, at least in the middle technology level, locatable receivers and/or devices for the authentication of animal-specific equipment. Other preferable embodiments of the invention are described in more detail later on.

LIST OF ILLUSTRATIONS

Figure 2:
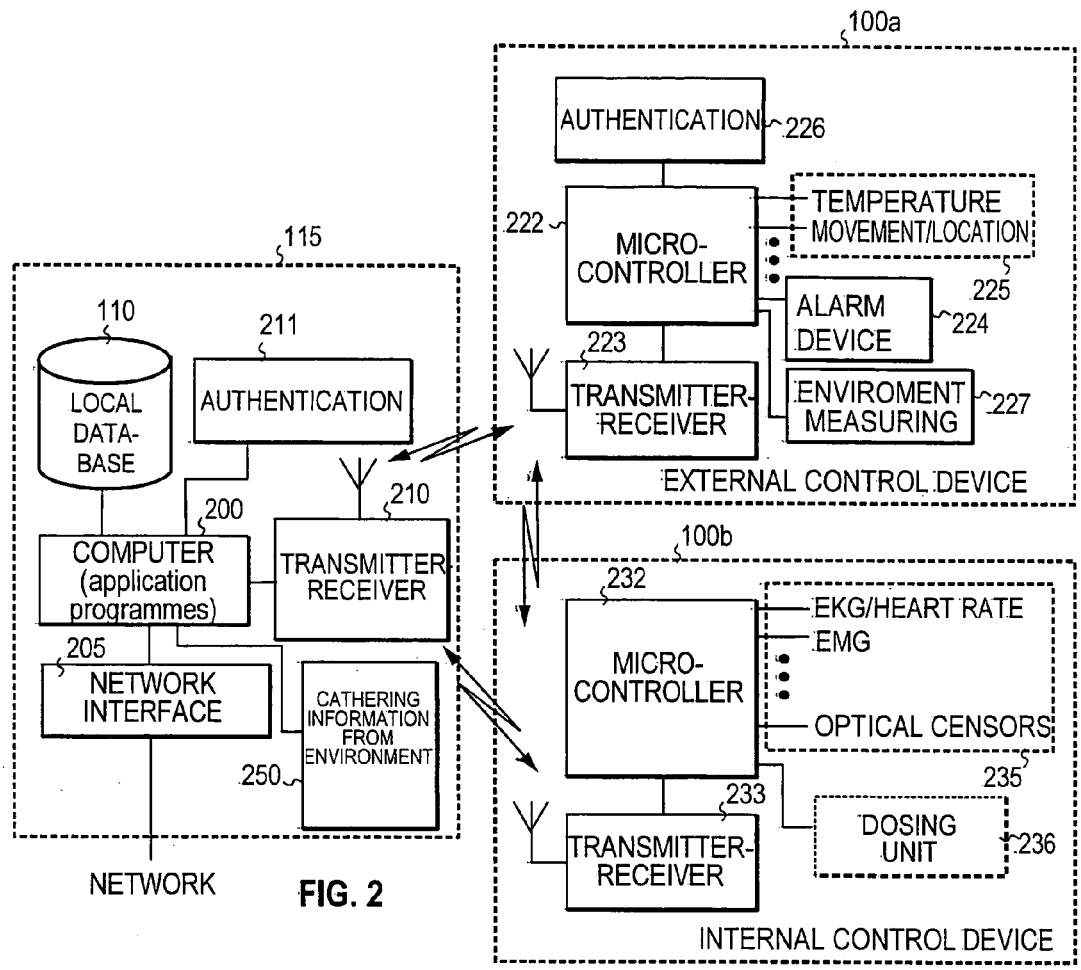
Figure 3:
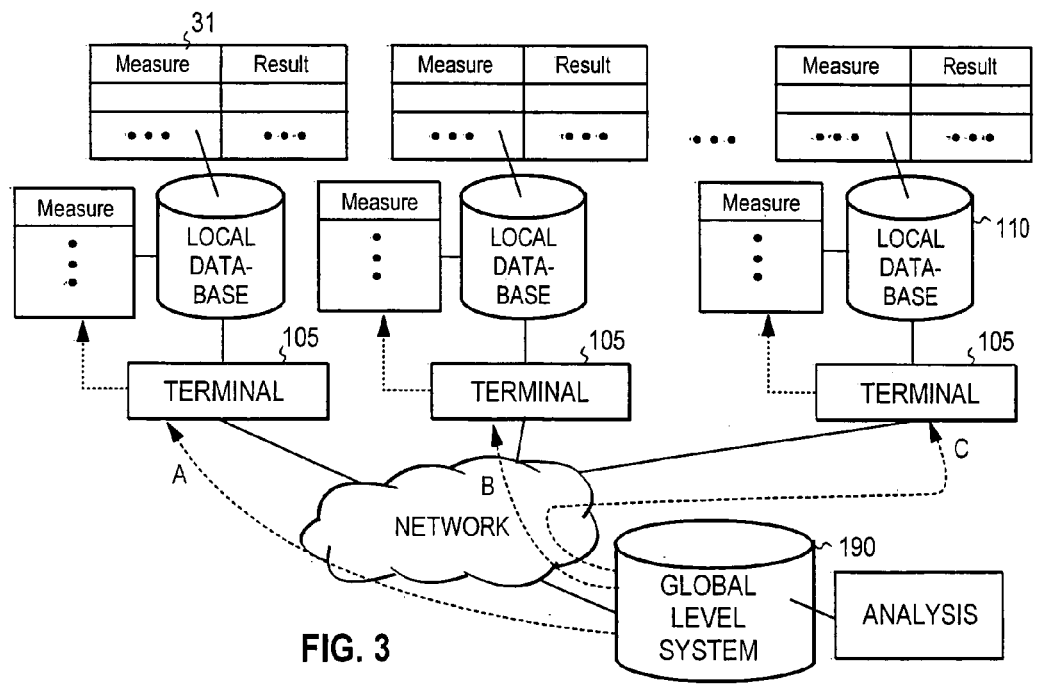
Figure 4:
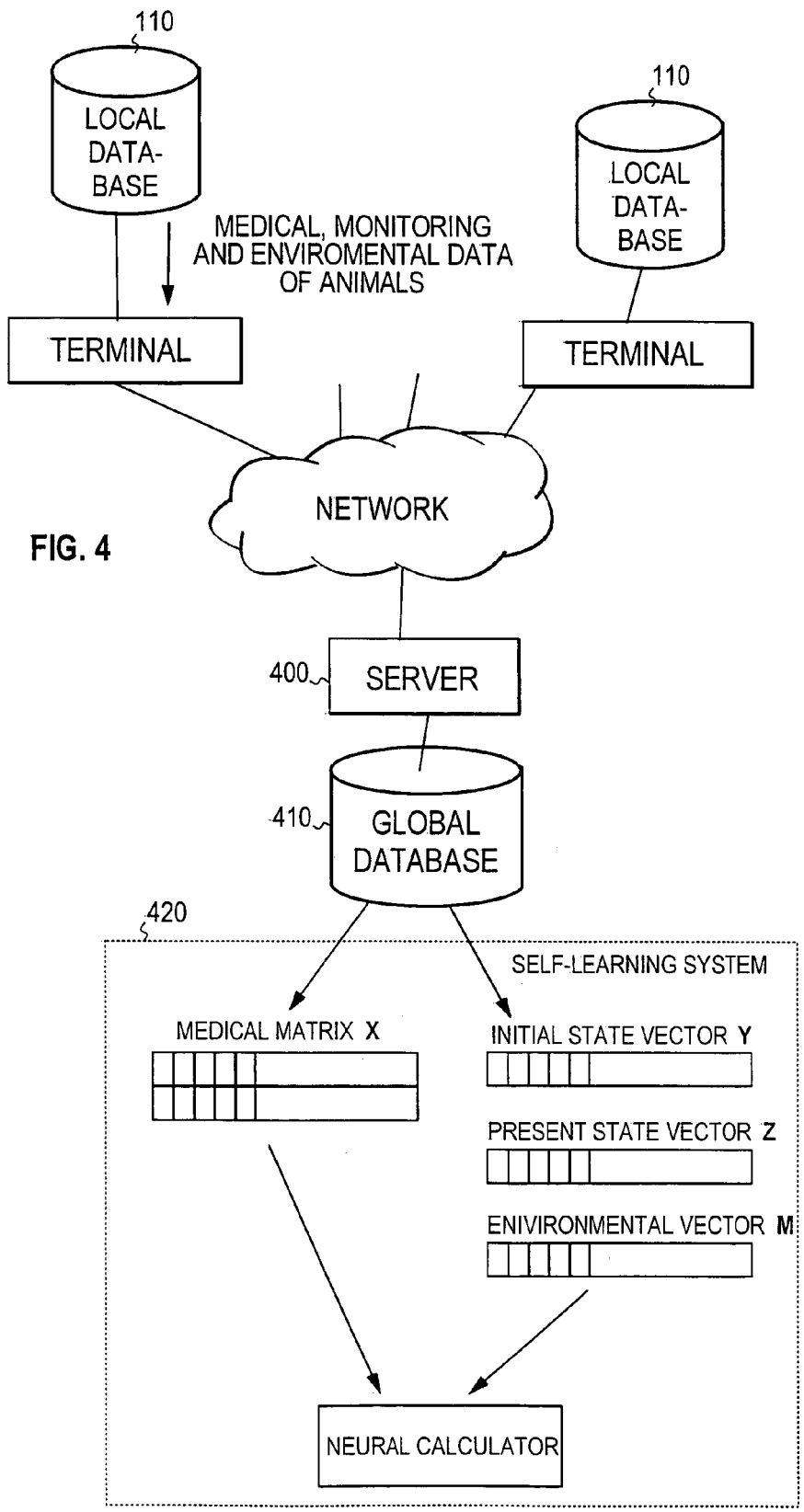
Figure 5:
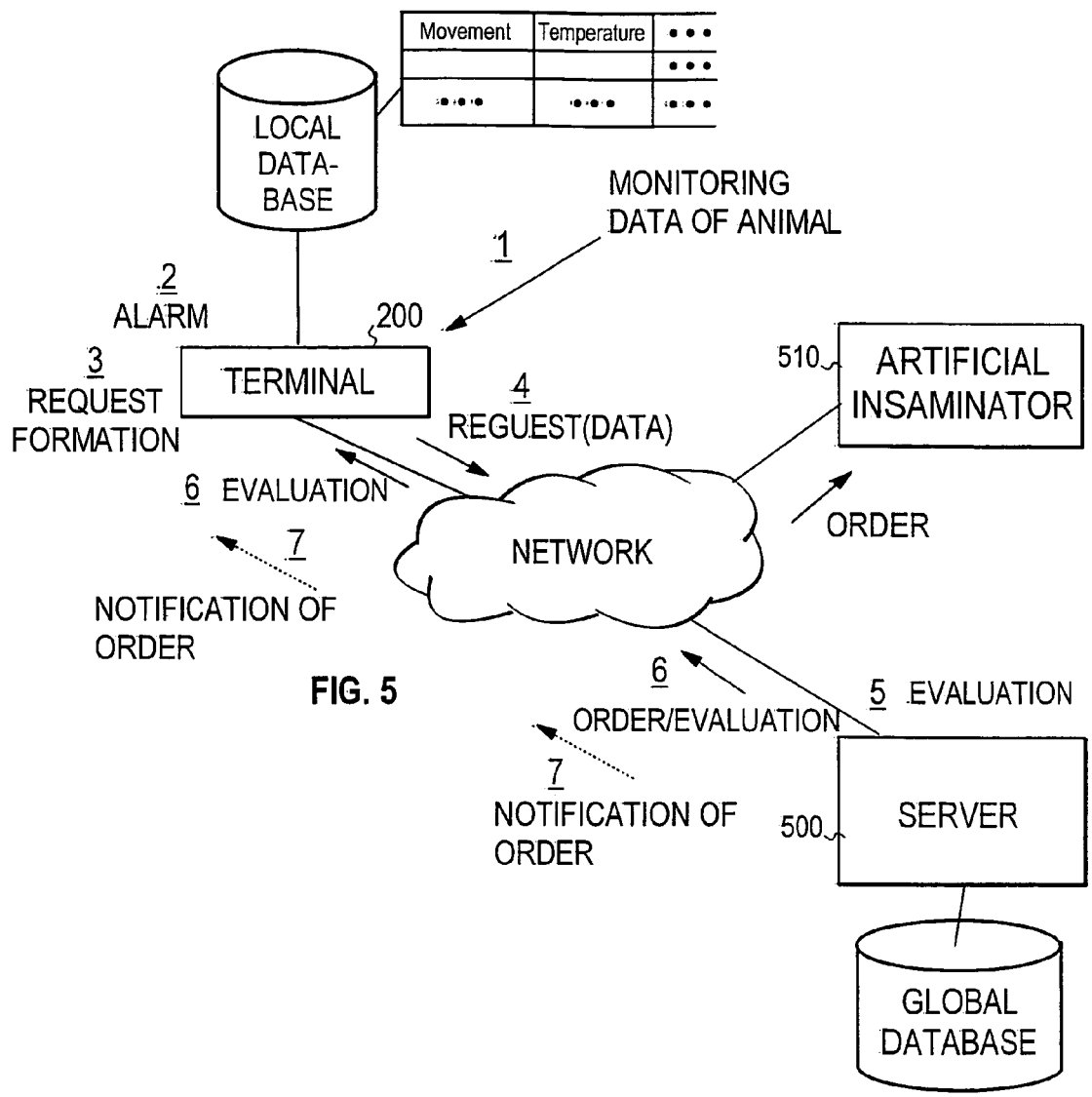
Figure 6:
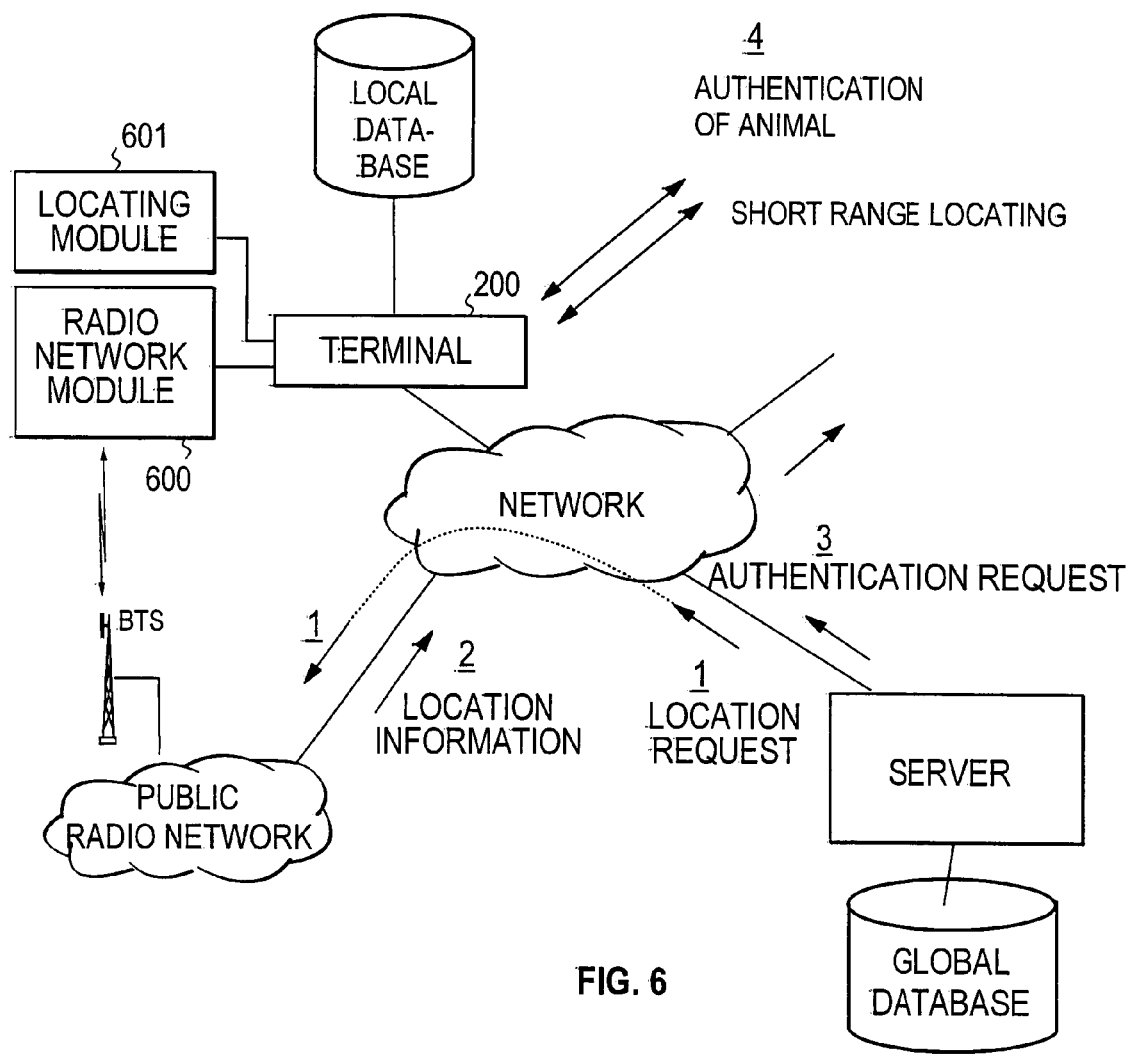

The following figures illustrate the invention in more detail:

FIG. 1 displays the overall architecture of a system based on the invention,

FIG. 2 displays an example of pico and local level systems,

FIG. 3 exemplifies activities of the global level as a higher level adjusting circuit, FIG. 4 illustrates the system as applied to the surveillance of the effects of medication, FIG. 5 illustrates the system as applied to the surveillance and control of animals in heat, and FIG. 6 illustrates the system's application to surveillance by authorities.

DETAILED DESCRIPTION OF THE INVENTION

FIG. 1 illustrates the basic principle of a system based on the invention. The system consists of three technology levels—which are in practice also its hierarchy levels—, the network technology connecting the levels and the information included in the overall system, saved in the databases of the two highest levels. The three levels are here referred to as local, global and pico level.

The Pico level, i.e., the lowest level comprises the technology used directly with the animals. A pico level device is attached permanently to, e.g., the animal's ear after its birth, and it functions like conventional identification tool. In other words, it replaces the presently used earmark that in Finland is provided by Maatalouden laskentakeskus Oy. The Pico level device, indicated by the reference 100 in the illustration, generally include at least the following components:

- RF transmitter/receiver used in the creation of a (programmable) radio network with the local level's terminal unit. This component can also be a mere RF transmitter.
- Antenna system, which in a typical application can be incorporated into the device attached to the animal.
- Energy supply instruments, which normally comprise, e.g., a lithium accumulator.
- Micro controller that coordinates radio transmissions between the pico and the local level and gathers parameter values from the censors attached to the animals. When necessary, the micro controller protects data saved in the device. As a part of the micro controller or as a separate component, the pico level also features an identifier.
- Censor unit connected to the micro controller for the surveillance of the animal's body temperature, occlusion, muscular action, motion or metabolic level. The censor unit can also be an implant inside the animal, in which case the data it provides can be, for instance, read/transcribed by the pico level equipment using the so-called Radio Frequency Identification Technology. It is also possible the censor unit includes components suitable for the dispersing of medicaments which enable the individual treatment of animals via a communications network, or detectors which alarm if the pico level device is detached from the animal.

As will be described later, pico level devices are also capable of utilizing technology that enables them to be located inside the farm, or within a wider range as required. The censor unit, for example, may feature a locator that uses the GPS, Glonass or Galileo system. It is also possible to base the locating on the timing of a local radio signal between fixed terminal units. When necessary, the pico level device can be built so that its software is downloadable through a radio network.

The middle, that is to say, local level consists in practice of one or more local 115 information systems, located in the farm of one farmer or breeder and tailored to meet its requirements by modifying a normal personal computer, for instance. At the very minimum, a local information system comprises a 105 terminal unit, typically featuring the 110 data base into which the terminal gathers local measuring and surveillance and other important information. Gathering, assessing and presenting data concerning the animals' health, the production environment and the farm are the functions of the local system. The terminal unit compiles information from pico and local levels, as well as from possible other devices 106, such as censors measuring the qualities of the production environment (humidity, light etc.). Through a network 120, e.g. Internet, the terminal unit can communicate with the higher global level.

A local level terminal unit typically comprises the following components:

- Central unit/controller that can be a part of a normal personal computer and which along with its other functions coordinates radio transmissions.
- Cordless short range RF transmitter/receiver component, connected to the central unit through interface electronics. The link can operate on the ISM frequencies (433 or 867 MHz), for instance.
- Connecting interface with the global level, that is, the communications network. The interface usually features a TCP/IP stack, but it can be realized by other known communications techniques as well. The connection can be fixed (ISDN, ASDL etc.) or wireless (GPRS, UMTS, WLAN, Bluetooth etc.).
- Monitor, keyboard, program and data memories Local level terminal units can also include a small video camera for the transmitting of footage about circumstances or animals to the global level to complement the measured data. The software of the terminal unit can be downloaded through the communications network.

The highest, global, level consists of a computer or computers linked to the communications network 120 and of software in the databases of which information sent by the local level is gathered, organized and refined. Information gathered about individual animals and production environments, as well as information, plans or actions concerning animals submitted by the farmer or other third party constitute the local level.

Based on the collected animal and farm information and expert knowledge, recommendations, treatment measures and management decisions are taken and prognosticated on the global level. The resulting new knowledge in turn spawns either immediate feedback measures or larger development projects, for it enables, for example, the research of large samples that may bring to light such weak connections that would otherwise escape observation. Feedback measures do not have to be launched from the global level, as local systems can access the data saved on the global level and thus update their records at regular intervals. For example, a local system can check the information about milk samples from the laboratory server before the commencing of the milking process, which would immediately reveal, say, a latent bovine mastitis.

The global level involves authorities, various enterprises linked to animal husbandry, research centers, universities and veterinarians. The system allows the authorities to remotely monitor, check and create statistics by gathering local data through the server 130 and saving the gathered information in their database 135.

Thanks to collected historical data and improved diagnosis methods, the system also enables individual health surveillance and the creation of remote health care services. Veterinarians can collect local level information with their server 140 and refine that data in their own database 145.

Research centers and universities can make use of the locally collected information by gathering the desired data with the server 150 and by saving the refined data in their database 155.

For companies the system offers the possibility of joining their own server 160 to the network and gathering the data they seek from local and global information systems to their own database 165. For instance, private veterinarians could execute the personified medicating of an animal and even control the used dose remotely through the network, an ampoule or other dosing device having been implanted in the animal.

As rendered obvious by the above-mentioned, the invention's system architecture allows for a plethora of applications and services. Applications fed on the data collected in the highest system level thus represent a wide variety. More efficient applications and better services result from a number of factors. First of all, data concerning an animal can be obtained from the pico and local levels throughout the animal's entire life span. Secondly, global level servers and databases feature algorithm and models, which are applied in the analysis of these and other possible data. Thirdly, the system allows the use of large samples, which, together with the local level knowledge enable the discovery of weak connections that may not necessarily be observed from smaller samples (local levels). The resulting knowledge permits each party to perform the measures they deem necessary; either directly on the animals or more generally for the development of the field of animal husbandry.

FIG. 2 exemplifies two different pico level devices connected to a local information system. The pico level control device can be either external (100*a*) or implanted inside the animal's tissue (100*b*). The device comprises censors of the censor unit (225 or 235) connected to a micro controller (222 or 232).

The external device can, for instance, measure the animal's body temperature (with a temperature censor) or movements (various motion censors, such as acceleration censors), or determine the animal's location. These results can be elaborated by, e.g., integrating with the information received from the acceleration censor.

The internal device enables, for example, the use of an EKG analysis for the surveillance of the animal's heart rate or an EMG (Electromyography) conveying its muscular tension or level of fatigue. Particularly the internal pico device permits the use of optical censors for the measuring of oxygen saturation, for instance.

The censor units are connected to a micro controller which gathers the information from the censors and controls the functions of the transmitter-receiver (223 or 233). In the case of the internal control device, the transmitter-receiver uses very little power (about 1 mW). The external device, in particular, may feature an additional alarm 224 which signals an optical or audio alarm upon the micro controller's detection of one or more surveillance results reaching the set alarm limit. The alarm can also be signaled electrically to the local, and possibly even to the global, level with the help of known communications services, such as the SMS service of the mobile communications network. The internal device may feature, for instance, a dosing unit 236 for the dispersing of the animal's medication. Each surveillance device includes a personalized identifier for the correct identification of the animal in question.

The pico level control device is connected to the local information system 115 through a short-range transmitter-receiver 223 or 233. In the local system the transmitter-receiver 210 that receives the measuring/surveillance data is connected to a computer 200 with the necessary software. Data received from the pico level surveillance devices and possible edited with the computer's application is saved into local databases 110, from which the users of the global level can access it. As mentioned before, the terminal unit may also feature censors 250 for the measuring of environment information.

The local information system, as well as each pico level device, is equipped with authentication units (211, 226) with which the local or global system can authenticate the pico level control devices belonging to the local level.

It is also possible that the pico level surveillance devices communicate directly to one another and that they form a pico network using, e.g., the Bluetooth technology. In this event the farmer may have a network covering the entire farm, with several connection points for pico level devices. A pico level device can also monitor environmental circumstances, such as lighting or temperature, either as its sole task or combined with animal surveillance, as illustrated in FIG. 2 (227).

As noted earlier, algorithms and knowledge models upheld in the global level systems, fed by locally collected data, are essential to the effectiveness of the system's services. Higher level adjustments, for instance, can be carried out on the global level. In this event causal relations observed on the local level will be analyzed globally, and the local levels will then be controlled based on this new information. FIG. 3 illustrates this principle. For example, a relation database 31 comprising certain local measures and their corresponding results, as measured with the pico devices, is created on each local level. These results are taken to a higher global level system 190 on which the desired analysis is performed on the chosen measure/result pairs. Local levels (arrows A, B and C) are controlled on the basis of the results of the analysis. In this case the global level information system adjusts (through the terminal 105) the measures of the local level so that maximal results can be achieved on each level. Different known methods of processing the gathered data can be used on the global level, such as rule-based expert systems, fuzzy systems, neural-fuzzy systems, statistical systems and systems using neural calculation. It is also possible that the global systems produce data to one another, or that several global systems form a dispersed system. Statistical dependencies, which could not be found by analyzing a single local system, can thus be observed on the global level. In the following, we will examine a surveillance system for medical effects, based on a self-learning system. A way of constructing this is with a self-organizing map (SOM). FIG. 4 illustrates the interaction of the different elements of the system. Medical and surveillance as well as environmental data are gathered from local databases and brought together in the server 400, connected to the global database 410 which provides the medical matrix and measuring vectors. Medicaments used in the treatment of the animals are described by the components of the medicine vector x. The medical matrix of each animal is individual. Its first line, or a part of it, depicts a single medicine or an active ingredient. As the value of the part is the used quantity of the medicine or active ingredient.

The time elapsed from the dispersing of the medicament is updated in the second part of the matrix. The matrix may also indicate different medicaments given simultaneously. The components of the environmental vector m represent the conditions in which the animal lives (e.g., temperature, humidity, light). The initial state vector y representing the same animal conveys the results obtained from the animal (e.g. temperature, movement, heart beat) at the time when the medication commenced, as divided into components. Conveying the latest results from the animal, there is also the present state vector. The goal is to discover a regular interdependency $z=f(x,y,m)$ between the used medicaments and the effects they have produced, using a large sample. A self-organizing map, for instance, can be used for this purpose. In that case the medicine matrix is transformed into a vector by lines, and the environment, initial state and present state vectors are combined into one vector $x'=(x,y,m,z)$ which is then inserted into a self-learning map. A typical map size is about 1000 elements. Vectors can be compared by using suitable metrics, such as the square of the remainder of the components. After a sufficient number of cases, groups of variables begin to accumulate at certain points on the map. The map can be made partially two-dimensional so that the dependence between medication and consequences may be observed visually as well.

The best medicament or combination of medicaments for a certain condition can be found with the self-learning map as follows: Form a vector x' consisting of just the initial state and environment vectors, y and m respectively. Choose the element on the map that is closest to this vector (in terms of the given metrics) and check the contents of the medicine vector x of that vector. The search can be restricted by, e.g., searching only for the medicaments whose effects have been the quickest.

An additional goal can be to find an inverse function $x=f^1(y,z)$ with which the necessary medical treatment could be found by analysing the animal's present condition. A possible embodiment of this may be based on a counter propagating network, as described, for instance, in the article Hecht-Nielsen, R., "Counterpropagation networks", Proc. of the Int. Conf. on Neural Networks, IEEE Press, June 1987, p. 19–32. The benefit of this kind of a network is rapid learning from the given sample. In the educational phase the matrix x, transformed into a vector, and the matrixes y, m and z are inserted into the network. The network collects a representative sample of the inserted vectors into its adaptive table. In case the vectors are not sufficiently different from those already in the table, instead of creating a new vector the closest of the existing ones will be updated with the suitable update function. During classification, the network offers the vectors y and z which are closest to the input x. In other words, when the used medication is described, the network produces the most likely development process of the animal's condition. The network is also capable of searching the inverse function; by inserting vectors y, m and z one gets the medical matrix x.

Medical treatment can be made more effective by a more thorough analysis of the medicament's impact. This calls for a large global database. Different medicaments which are of about the same potency can be compared in more detail. Genetic algorithms, for example, enable controlled variations in medical treatment, which makes it possible to observe small impact changes. By finding working medicaments with this method, medication can be optimized.

Provided that environmental and feed information have been recorded in detail throughout the animal's life span, the kind of a statistic analysis based on neural calculations as mentioned earlier can be carried out with respect to the quality of the beef cattle, too. More information about the effects of different treatments to the end products can thus also be obtained.

The application of a system based on the invention in the processes of heat control and artificial insemination is described in the following: in FIG. 5 the functions between the different elements of the system are illustrated with underlined numbers. To monitor the animal's heat with a pico level device, body temperature and movement are usually measured. The obtained information is received by the local level information system (phase 1). When the local system notices that the alarm limit(s) have been reached, it signals a heat alarm (phase 2) after which its terminal unit sends a request to the global system (phase 3). A network server 500 receives the request (phase 4) and calculates a statistic evaluation of the suitability of different semen types in each case (phase 5), based on the data transmitted with the request and possible pre-existing data concerning the animal saved in the server's own database. If essential data about the animal are continuously updated in the global server, it is enough to simply convey the animal's identifier in the request. Normally, however, the request includes information about the animal and about the farmer's strategy decisions.

Ample information regarding the suitability of different semen types for different breeds in different environments is gathered on the global level. This data, accompanied by that included in the request and the possible pre-existing files saved in the server, enable the preparation of a statistical analysis of the suitability of different breeding animals to each case. The results of the analysis can be either sent back to the local level (phase 6), so that the breeder can him/herself decide the measures to pursue, or the server may automatically send a request order to the artificial inseminator's server 510. In the latter case the breeder may be issued a notification of the order (phase 7). This can be done in a number of ways, for example, as an SMS.

As the local system receives an analysis or a request, it may start to adjust the conditions of the animal's surroundings, e.g., temperature. With the terminal unit the breeder may also identify the animal in question before any disturbance in the cattle occurs.

FIG. 6 exemplifies how a system based on the invention may be used by authorities for surveillance purposes. The local level terminal unit may be equipped with a radio network module 600 with a secret number. This module may use, for example, GSM technology. The local terminal also has a locating module 601 which controls that the device is not moved and which has a monitored connection with the terminal unit 200. The locating module can be located by a sealed attachment to either a certain place or to the locating system. The locating function may also be built into the radio network module 600. The authorities may run a local level check by sending an inquiry from their server to the locating module 601 via the radio network (phase 1). The locating module will then reply, indicating whether its location has changed (phase 2). At this point the authorities know that the terminal unit is at the farm and that the pico level devices are within a short range from it. If deemed necessary, they may also authenticate each pico device individually by sending an authentication request to the local level terminal unit (phase 3). The authentication of the pico level devices can be carried out from the local level terminal unit or directly from the "authority" server that is connected to the network. For this, known authentication protocols, such as those based on a one-way function, e.g., S/KEY, or two-factor authentication can be used.

These measures, however, are only sufficient for the authentication of pico level devices. To be able to verify that there actually is an animal matching each device, the authentication response sent by the pico device must confirm that the device has been attached to the animal at all times. For this one can use information received from the censors proving that each device is attached to a different animal, such as temperature, for instance: the temperatures have to fall within a distribution that meets certain conditions.

The short-range locating, as explained above, can be used to complement the locating of the local terminal unit: each pico level device can be located separately in order to make sure that more than one devices are not attached to a single animal. This way all animals can be located at all times within, e.g., a local area network covering the entire farm.

As said, the system can be used locally for other tasks than mere animal-specific surveillance and measuring; local conditions, such as temperature or light, can also be added to its coverage.

Although the invention is here explained in relation to the examples illustrated by the provided figures, it is clear that its possible applications are not confined to these usage's only. Within the scope of its scientific idea it can find a host of applications.

The invention claimed is:

1. A system for surveillance of animals, the system comprising
    identification and measuring elements having a short-range transmitter-receiver (100) attached to the animals for identification checking and animal-specific measuring,
    at least one local level information system (115) which is wirelessly connectable to the identification and measuring elements attached to a certain group of the animals in a certain local level and which is adapted to save results of the animal-specific measuring,
    a terminal unit (200) of a communications network situated in the certain local level information system, wherein the terminal unit (200) includes a locating function that is built into a locating module (600) or a radio network module (601),
    at the minimum, one higher level information system (130, 135) adapted to be in connection with a certain local level information system through the terminal unit (200) for receiving animal-specific data based on said results,
    at least one software application adapted to process the animal-specific data at a higher level information system, said processing resulting in animal information which is sent to at least one other higher level system, and
    authentication elements (211, 226) arranged in the certain local information system for authenticating the identification and measuring elements, wherein each higher level information system, which has received the sent animal information, is able
    to verify the location of the terminal unit (200) by means of the locating function,
    to authenticate the identification and measuring elements, and after that
    to identify the animals, and
    to control the animals and/or their environment on the basis of the animal information with which the animals have been identified.

2. The system as in claim 1, the system further comprising several local level information systems, each of which being adjusted to collect the results of the animal-specific measuring.

3. The system as in claim 2, wherein a radio network module (600) is connected to the terminal unit (200).

4. The system as in claim 2, wherein the identification and measuring elements of different animals are adapted to communicate with one another wirelessly.

5. The system as in claim 2, wherein the identification and measuring elements are fitted outside the animals.

6. The system as in claim 5, wherein the identification and measuring elements feature dosing elements (236) for dispersing a predetermined dose into each animal.

7. The system as in claim 2, wherein the identification and measuring elements are fitted inside the animals.

8. The system as in claim 1, wherein the certain local level information system features a wireless local area network in which the identification and measuring elements (100) are nodes of the wireless local area network.

9. The system as in claim 1, wherein the higher level information system is functionally connected to a self-learning system (420).

10. A method for surveillance of animals, the method comprising the steps of
    identifying the animals carrying identification and measurement elements equipped with a short-range transmitter-receiver (100),
    performing measurements concerning the animals' condition and
    saving results of the performed measurements into a certain local information system (115),
    gathering animal-specific data obtained from said results to at least one higher level information system (130, 135) which is adapted to be connected to the certain local level system (115) through a terminal unit (200) of a communications network, the terminal unit (200) including a locating function that is built into a locating module (600) or a radio network module (601),
    producing animal information by means of at least one software application which is adapted to read the animal-specific data gathered in the higher level system (130, 135),
    transmitting the animal information to another higher level information system and at said other higher level information system,
    verifying the location of the terminal unit (200) by means of the locating function,
    authenticating by means of authentication elements arranged in the local information system via the terminal unit (200) the animals carrying the identification and measuring elements, and
    controlling said animals and/or their environment on the basis of the animal information with which the animals have been identified.

11. The method as in claim 10, the method comprising the step of retrieving the animal information to the certain local level system (115).

* * * * *